United States Patent [19]

Nord

[11] 3,960,296
[45] June 1, 1976

[54] THERMOPLASTIC DISPENSER

[75] Inventor: Eric T. Nord, Oberlin, Ohio

[73] Assignee: Nordson Corporation, Amherst, Ohio

[22] Filed: Sept. 9, 1974

[21] Appl. No.: 504,378

[52] U.S. Cl. .............................. 222/146 HE; 401/2
[51] Int. Cl.² .......................................... B67D 5/62
[58] Field of Search ..... 222/146 R, 146 H, 146 HE; 18/30 JM; 401/1, 2; 425/87, 378, 379

[56] References Cited
UNITED STATES PATENTS

| | | | |
|---|---|---|---|
| 2,773,496 | 12/1956 | Czarnecki | 126/343.5 |
| 3,550,815 | 12/1970 | Salonen | 222/146 HE |
| 3,587,930 | 6/1971 | Schultz | 222/146 HE |
| 3,744,921 | 7/1973 | Weller et al. | 222/146 HE |

Primary Examiner—Robert B. Reeves
Assistant Examiner—Larry H. Martin
Attorney, Agent, or Firm—Wood, Herron & Evans

[57] ABSTRACT

An adhesive dispensing gun for translating solid slugs of thermoplastic feedstock from the solid state to a molten state. The gun is pneumatically cooled to control solid/melt feedstock interface within the gun's barrel and is pneumatically powered to discharge the molten feedstock in response to operation of a trigger. The gun barrel includes a forming die adapter or sleeve located partially upstream of the solid/melt feedstock interface. The upstream end of the adapter or sleeve is flared inwardly so as to form a section internally of the barrel for reforming or reshaping varying sized slugs as they enter the forming die adapter and while the entering section of the slug is still in a solid state. The forming die adapter thus enables the adhesive gun to accept varying sizes of slugs while preventing meltback along the exterior of slugs which are nominally substantially smaller in diameter than the inside diameter of the barrel.

14 Claims, 6 Drawing Figures

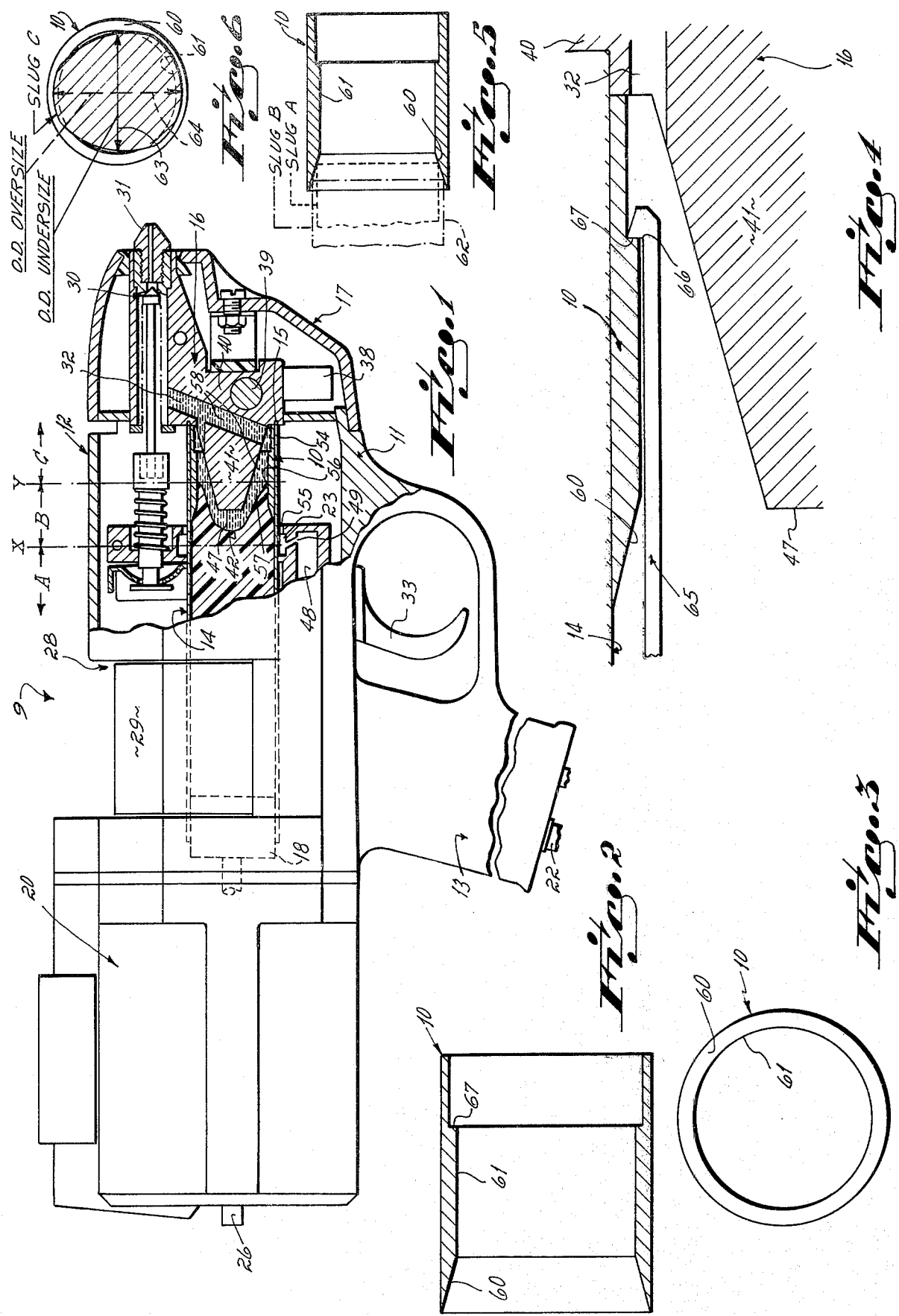

THERMOPLASTIC DISPENSER

This invention relates to a dispenser of thermoplastic material and particularly to a handgun type of dispenser which is adapted to translate solid slugs of feedstock into molten feedstock and to discharge that molten feedstock by actuation of a trigger. More particularly, the invention relates to an improved barrel construction for use in a handgun dispenser of hot melt adhesives.

A number of handgun type dispenser devices are known to the prior art for applying a hot melt adhesive to a workpiece. Each such handgun device is in the nature of an extruder in the sense that it translates solid feedstock into melt form and then discharges that molten feedstock onto the workpiece as desired by the operator. Such a dispensing device is generally referred to as a "gun" because of its overall similarity and configuration in operation to a handgun. That is, each such handgun type dispensing device is generally provided with a pistol grip handle portion, a generally barrel-shaped portion within which the feedstock is melted, and a trigger mechanism by means of which feedstock discharged from the barrel is controlled. More specifically, a typical handgun dispenser for hot melt adhesive includes a barrel and a heater block located at the barrel's fore end. A ram located at the barrel's aft end forces solid feedstock through the barrel into proximity with the heater block where it is turned molten at a solid/melt interface. The molten adhesive is then directed from the heater mechanism to a discharged valve/nozzle, discharge of the molten adhesive being controlled by the gun's trigger mechanism.

An unique and useful handgun type dispensing device having the general functional characteristics described above, but without the novel barrel construction of this invention, is disclosed in U.S. application Ser. No. 307,020, now abandoned, entitled "Adhesive Gun," filed Nov. 16, 1972 and assigned to the assignee of this application.

For ease of handling and loading, feedstock for such guns is most commonly supplied in the form of solid slugs or rods of the same or slightly smaller diameter than that of the gun barrel. These slugs or rods of feedstock are formed from many different hot melt adhesive type feedstocks having varying adhesive properties, as well as a wide range of mechanical and physical properties. The slugs or rods commonly range from hard and rigid to very soft and plastic.

One problem commonly encountered in using hot melt dispensing guns of the type described hereinabove is that of obtaining consistently sized bars of adhesive material from a supplier, or alternatively, of manufacturing consistently sized rods or slugs of feedstock capable of use in such a dispensing gun. The rods or slugs of feedstock are commonly manufactured by an extruding process and then cut to length. Differing formulations of feedstock have differing shrink rates with the result that it is possible to extrude differing formulations through the same die and still have wide variation in nominal diameter of the resulting extruded rod of material. As an example, it is not unusual to obtain as much as 3/16 inch variation in diameter from a nominal 1 inch diameter die by simply varying the formulation of the feedstock material. This much variation is intolerable when that same feedstock is then subsequently dispensed from a dispensing gun, primarily because the small diameter slugs present a large gap between the interior surface of the barrel and the exterior of the slug. Pressurized molten material flows backwardly through this gap over the exterior of the solid adhesive, cools and then hardens to cause a complete jam of the gun, particularly if the meltback runs as far back as the loading breech of the gun.

To combat these problems and still enable varying size slugs to be used in the gun, the invention of this application contemplates the location of a forming die adapter sleeve located in the melt zone of the barrel and extending aft of it. The entry or throat of this forming die is flared or tapered so that the die or sleeve will accept slugs varying in diameter from a nominal diameter the same as the nominal diameter of the barrel to a diameter the same as the interior of the sleeve. If the slug is of approximately the same diameter as the barrel, the taper causes the slug to be compressed as it passes through the throat of the die. The use of the forming die interiorly of the barrel enables the gun to accept and utilize slugs of much greater variance in diameter than is possible without the presence of the die.

Preferably, the tapered entry or throat of the forming die is located immediately adjacent but behind or upstream of the melt zone of the barrel where the solid feedstock is subjected to heat and is consequently soft, but is still in the highly viscous state. The softened feedstock is more readily compressible, particularly in the case of high viscosity feedstock materials, and consequently large diameter slugs may be more easily forced through the inwardly flared throat of the forming die if it is positioned at this point than would be the case if it were located more rearwardly in the barrel.

This invention envisions the use of several different internal diameter dies which are interchangeable and alternatively usable in a single gun barrel. This interchangeability enables one forming die to be removed and replaced with another different internal diameter forming die. Consequently, the provision of several differing and interchangeable nominal size forming dies with a single gun enables the gun to accept and dispense a wide variance of materials and diameter slugs.

These and other objects and advantages of this invention will be more readily apparent from the following description of the drawings, in which:

FIG. 1 is a side elevational view of a dispensing gun, partially in cross section, incorporating the invention of this application.

FIG. 2 is a cross sectional view of a forming die employed in the practice of the invention of this application.

FIG. 3 is an end elevational view of the forming die of FIG. 2.

FIG. 4 is a cross sectional view of a portion of FIG. 1 illustrating the manner of removal and replacement of the forming die in a gun barrel.

FIG. 5 is a cross sectional view similar to FIG. 2 but illustrating in phantom the manner in which the forming die accommodates and seals differing diameter slugs of feedstock.

FIG. 6 is a cross sectional view similar to FIG. 3 illustrating how the forming die of this invention accommodates and seals "out of round" slugs of feedstock.

A complete and detailed description of the handgun 9 illustrated in FIG. 1, but without the forming die 10 of this invention is to be found in U.S. patent application Ser. No. 307,020, filed Nov. 16, 1972, and assigned to the assignee of this application. For purposes of completing this description, that description is hereby incorporated by reference.

As illustrated in FIG. 1, the handgun 9 includes a housing 11, having a generally barrel-shaped portion 12 and a pistol grip type handle 13 depending from the underside of the barrel shaped section 12. A cylindrical barrel 14 is located inside the gun's housing 11, the barrel's axis being substantially parallel to the axis of the housing barrel portion 12. The barrel 14 is seated as at 15 in a heater block 16, located at the fore end 17 of the gun. The barrel receives an axially movable ram 18 at the aft end. The ram is driven fore and aft, i.e., is extended and retracted, by a pneumatic motor 20 that is controlled through use of a spool valve (not shown), the pneumatic motor being supplied with pressurized inlet air through an inlet air line 22. An annular cooling chamber 23 is established about the gun's barrel 14 to maintain a solid/melt interface inside the barrel adjacent the heater block 16, that zone being air cooled by pressurized inlet air taken from inlet air line 22.

A telltale rod 26, cooperatively interconnected with the ram 18 indicates when recharging of the barrel 14 is required. The barrel 14 is charged with the slug of feedstock through charging port 28 located topside of the barrel just forward of the ram 18 when the ram is fully retracted. A safety cover 29 is mounted to cooperate with the charging port 28.

A dischage valve 30 is located at the fore end 17 of the barrel-like housing 11, the discharge valve controlling discharge of the molten feedstock through nozzle 31. Molten feedstock is transferred under hydraulic pressure from the barrel 14 to the discharge valve 30 through bores 32 in the heater block 16. The discharge valve 30 is actuatable by an operator through the use of a trigger assembly 33.

In use, the barrel 14 is first charged with a slug of feedstock while the ram is fully retracted. Such charging can be accomplished only when the ram is fully retracted.

When pressurized inlet air is introduced into the pneumatic motor 20 behind the ram it causes the ram to move forwardly toward the gun nozzle 31. This movement forces the feedstock against the heater block 16 where it is melted and forces the feedstock through the bores 32 into discharge valve 30. When desired by the operator, discharge valve 30 is opened by pulling on trigger 33, thereby discharging the desired quantum of melt through nozzle 31.

The gun's heater block 16 functions to translate the solid feedstock into molten feedstock. The heater block 16 includes a base 40 and a frusto-cone 41 integral with the base. The base 40 of the heater block is provided with one or more electrical resistance type heater elements 39. A temperature control such as a mechanical thermostat 38, or an electronic temperature control which senses the heater block 16 temperature and modulates the electric power to the resistance heating elements is fixed to the heater block and is incorporated into an electrical circuit which includes resistance heater 39.

The gun's annular cooling chamber 23 is part of the gun's air distribution system. It functions to establish and locate the melt/solid interface 42 of the feedstock. Additionally, it prevents the interface from moving rearwardly toward the gun's charging port 28.

The cooling chamber 23 is disposed co-axially with the barrel 14 on the outside thereof must aft of the frusto-cone's face 47. A distribution bore 48 is connected to the gun's air distribution system and runs axially of the housing beneath the barrel 14. The distribution bore 48 communicates with the cooling chamber 23 through a metering orifice or restrictor 49. Cooling of the barrel is effected as a consequence of cooling air flowing from an annular channel or orifice 55 located around the complete periphery of the barrel 14. This channel 55 forms an annular port which directs the cooling air axially forward over the exterior surface of the barrel so as to establish a large axial thermal gradient in the barrel section 54 adjacent to the heater block 16.

The barrel 14 may be considered as having a solid feedstock feed zone A, a feedstock softening zone B, and a feedstock melt zone C. These zones are delineated in FIG. 1 by the planes X and Y, that portion behind or upstream of the vertical plane X being the feed zone A, the portion forward of the vertical plane Y being the melt zone C, and the zone between the planes X and Y being the softening zone. The thermal gradient along the barrel 14 extends from a temperaure above the melt temperature of the feedstock in the melt zone C of the barrel to a barrel temperature below the melt temperature of the feedstock in the softening zone B and the solid feedstock feed zone A. The point at which this thermal gradient is at about the same temperature as the melting temperature of the feedstock is the point 56 at which the solid/melt interface 42 contacts the barrel 14.

It is to be noted that the point 56 is within the confines of the converging channel 57 defined by the exterior of the conically shaped heater 41 and the interior surface of the barrel so that the solid feedstock is flared or forced outwardly by the cone shaped section 41 of the heater. This flaring of the solid feedstock by the conical heater tends to form a mechanical seal or dam at the point 56 at which the solid/melt interface 42 contacts the interior surface of the barrel.

Between the point 56 which is located in the plane Y (the point at which the solid to molten material interface 42 contacts the interior surface of the barrel) and the plane X is the softening zone B in which the solid thermoplastic material is at a higher temperature than it is behind the plane X in the feed zone. This higher temperature causes the solid feedstock material to be softened with the result that it may generally be forced, even if it is of the same diameter as the internal diameter of the barrel 14, through a tapered throat 60 of a metallic, heat conductive forming die 10. The forming die 10 is preferably machined from aluminum and configurated as a sleeve having an exterior diameter of approximately the same diameter as the interior diameter of the barrel 14. It is fitted so that it may be removed from the forward end of the barrel. The length of the sleeve is approximately the same as the distance from the forward end of the cone 41 to a point midway between the planes X and Y. In one preferred embodiment of the invention, the inside diameter of forming die 5 is approximately ⅛ inch less than the outside diameter.

The function of the forming die 10 is to enable varying diameter slugs of feedstock to be moved through the barrel and dispensed from the gun without allowing molten feedstock to pass over the exterior of small diameter slugs along the inside surface of the barrel 14.

Hydraulic pressure causes the molten material to flow through a gap between the slug and the barrel, if one exists, and consequently it is important to maintain contact between the exterior surface of the slug and the interior surface of the barrel. The forming die 10 insures this contact, even in the event that an undersize slug is fed into the gun.

In one preferred embodiment of the invention, the difference between the minimum inside diameter and the outside diameter of the forming die 5 is ⅛ inch so that the die effectively maintains a seal with slugs which vary in diameter by as much as ⅛ inch. This difference may of course be increased if the slug feedstock is a soft or resilient material in the solid state.

Referring to FIG. 5, there is illustrated the manner in which the forming die 10 accommodates varying size slugs while still maintaining a seal between the inside surface 61 of the die and the exterior surface 62 of the slug. So long as the diameter of the slug A or 13 is less than the inside diameter of the surface 61 of the die 10, the die will maintain a molten feedstock backflow prevention seal between the slug and the die. If the slug is out of round as illustrated in FIG. 6, the forming die will even accommodate a minor diameter 63 which is less than the inside diameter of the surface 61 of the die and still form an effective seal. This is accomplished by compressing the major diameter 64 of the slug C and using that excess stock to force the minor diameter of the softened feedstock outwardly to fill any gap between the outside surface of the slug and the inside surface 61 of the die. Some gap between an out of round slug and the inside surface 61 of the die 10 is tolerable provided that the minor diameter section is forced sufficiently close to the inside surface of the forming die to provide a restricted choke or barrier to prevent backflow of molten feedstock through the gap. However, if the gap between the minor diameter 63 of the slug C and the die is too great, then a sizing die of smaller inside diameter must be inserted into the gun in order to provide adequate slug to the sealing.

To enable the gun to be used with varying feedstock slugs and with a very large variance of slug diameters, this invention includes multiple interchangeable dies 10 in a single gun. When it is desired to change dies 10 from one with a heavier side wall thickness to one of lesser side wall (from smaller inside diameter to larger) or vice versa, a tool 65 as illustrated in FIG. 4 may be inserted into the closed end barrel from the rear to engage a shoulder 66 of the tool 65 with a counterbored shoulder 67 of the die. So engaged, the tool 65 may be employed as a hook to pull the die 10 from the barrel for purposes of replacement.

While I have described only one embodiment of my invention, persons skilled in the art may readily appreciate the numerous changes and modifications which may be made. Therefore, I do not intend to be limited except by the scope of the following appended claims.

Having described my invention, I claim:

1. A dispensing device for translating solid slugs of thermoplastic feedstock material from a solid state to a molten state and for dispensing said feedstock while in the molten state, said dispensing device comprising
   a barrel having an input end and a discharge end,
   a ram movable within said barrel to effect movement of a solid slug of thermoplastic feedstock material from the input end of said barrel toward the discharge end,
   a heater located adjacent the discharge end of said barrel for heating said feedstock and converting it from the solid to the molten state, said heater including a heater block located within said barrel and projecting rearwardly from the discharge end of the barrel and having a peripheral surface radially spaced inwadly from the inside surface of said barrel
   said barrel having successive zones defined therein comprising a solid feedstock feed zone, a feedstock softening zone, and a feedstock melt zone, said feedstock melt zone being located adjacent the discharge end of said barrel and in close proximity to said heater block, and
   a tubular forming die at least partially located within said feedstock softening zone of said barrel, said forming die having at least one portion of a lesser inside diameter than the solid feedstock feed section of said barrel,
   said forming die having a tapered throat located adjacent the rearward end of said heater block and within said softening zone for receiving a solid slug of feedstock material and guiding it into said one portion of said forming die in which said solid slug is sized by said forming die so that surface contact is maintained between said solid slug of feedstock material and said forming die substantially all the way around the periphery of said solid slug of feedstock material, said surface contact being operative as a physical dam to prevent rearward flow of molten feedstock material past said one portion of said forming die.

2. The dispensing device of claim 1 in which said forming die is a heat conductive metal sleeve removably mounted within said barrel.

3. The dispensing device of claim 1 in which said forming die is removable and replaceable with dies of varying size to accommodate differing sizes of feedstock material in said dispensing device.

4. The dispensing device of claim 1 in which said forming die is in the form of a heat conductive metal sleeve which extends from said melt zone of said barrel into said softening zone.

5. The dispensing device of claim 4 in which said sleeve has a counterbored end section defining a shoulder, said shoulder being adapted to be contacted by a hook shaped pulling tool so as to facilitate removal of said sleeve from said barrel.

6. A hot melt adhesive dispensing handgun for translating solid slugs of thermoplastic feedstock material from a solid state to a molten state and for dispensing said feedstock while in the molten state, said handgun comprising
   a supporting body having a handle grip extending downwardly therefrom,
   a barrel mounted within said body, said barrel having a feedstock input end and a discharge end,
   said discharge end of said barrel being in communication with a gun discharge nozzle,
   a valve located within said gun body for controlling flow of molten feedstock from said nozzle,
   a trigger located adjacent said hand grip and operatively connected to said valve,
   a ram movable within said barrel to effect movement of a solid slug of thermoplastic feedstock material from the input end of said barrel toward the discharge end, a motor mounted upon said gun body rearwardly of said ram for controlling actuation of said ram, a heater located adjacent the discharge end of said barrel for heating said feedstock and converting it from the solid to the molten state, said barrel having successive zones defined therein comprising a solid feedstock feed zone, a feedstock softening zone, and a feedstock melt zone, said feedstock melt zone being located adjacent the discharge end of said barrel and in close proximity to said heater, and a tubular forming die located interiorly of said barrel, said forming die being at least partially located within said feedstock softening zone of said barrel, said forming die having at least one portion of a lesser diameter than the solid feedstock feed section of said barrel, said forming die having a tapered throat located within said softening zone for receiving a solid slug of feedstock material and guiding it into said one portion of said forming die in which said solid slug is sized by said forming die so that surface contact is maintained between said solid slug of feedstock material and said forming die substantially around the periphery of said solid slug of feedstock material, said surface contact being operative as a physical dam to prevent rearward flow of molten feedstock material past said one portion of said forming die.

7. The handgun of claim 6 in which said forming die is a heat conductive metal sleeve removably mounted within said barrel.

8. The dispensing device of claim 7 in which said forming die is one of a set of removable and replaceable dies of varying inside diameter to accommodate differing sizes of slugs of feedstock material in said handgun.

9. The handgun of claim 6 in which said forming die is in the form of a heat conductive metal sleeve which extends from said melt zone of said barrel into said softening zone.

10. The dispensing device of claim 9 in which said sleeve has a counterbored end section defining a shoulder, said shoulder being adapted to be contacted by a hook shaped pulling tool so as to facilitate removal of said sleeve from said barrel.

11. The dispensing device of claim 1 in which said tubular forming die is concentrically disposed about one end of said heater.

12. The dispensing device of claim 6 in which said heater has a frusto-conical portion and the length of said forming die is greater than the length of said frusto-conical portion of said heater.

13. The dispensing device of claim 1 in which said tubular forming die is located interiorly of said barrel.

14. A dispensing device for translating solid slugs of thermoplastic feedstock material from a solid state to a molten state and for dispensing said feedstock while in the molten state, said dispensing device comprising a barrel having an input end and a discharge end, a ram movable within said barrel to effect movement of a solid slug of thermoplastic feedstock material from the input end of said barrel toward the discharge end, a heater located adjacent the discharge end of said barrel for heating said feedstock and converting it from the solid to the molten state, said barrel having successive zones defined therein comprising a solid feedstock feed zone, a feedstock softening zone, and a feedstock melt zone, said feedstock melt zone being located adjacent the discharge end of said barrel and in close proximity to said heater, and a sizing constriction located within said feedstock softening zone of said barrel, said sizing constriction being of a lesser inside diameter than the solid feedstock feed section of said barrel, said sizing constriction being operative to compress at least a portion of stock material as it passes through said feedstock softening zone of said barrel so as to establish surface contact between said solid slug of feedstock material and said constriction substantially all the way around the periphery of said solid slug of feedstock material, said surface contact then being operative as a seal and physical dam to prevent rearward flow of molten feedstock material past said constriction.

* * * * *